No. 622,477. Patented Apr. 4, 1899.
J. HUCK.
CYCLE OR OTHER WHEELED VEHICLE.
(Application filed Dec. 9, 1898.)
(No Model.) 2 Sheets—Sheet 1.
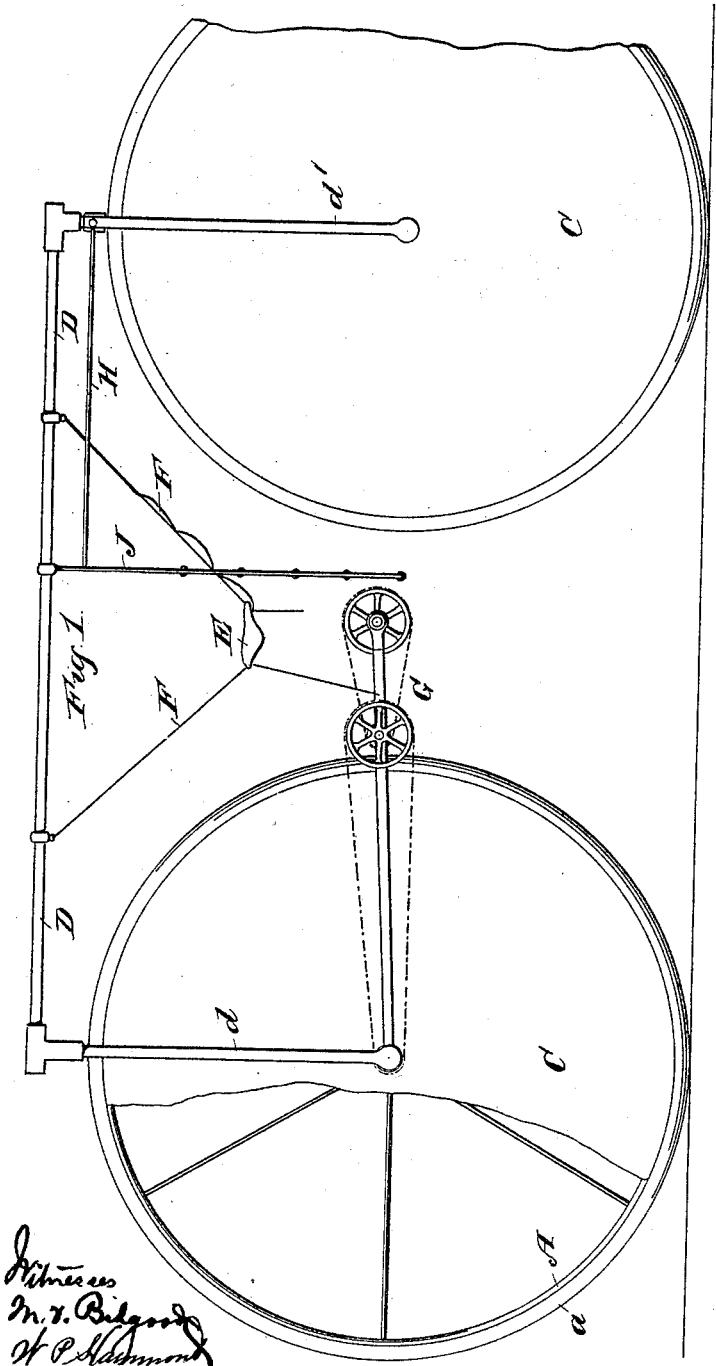
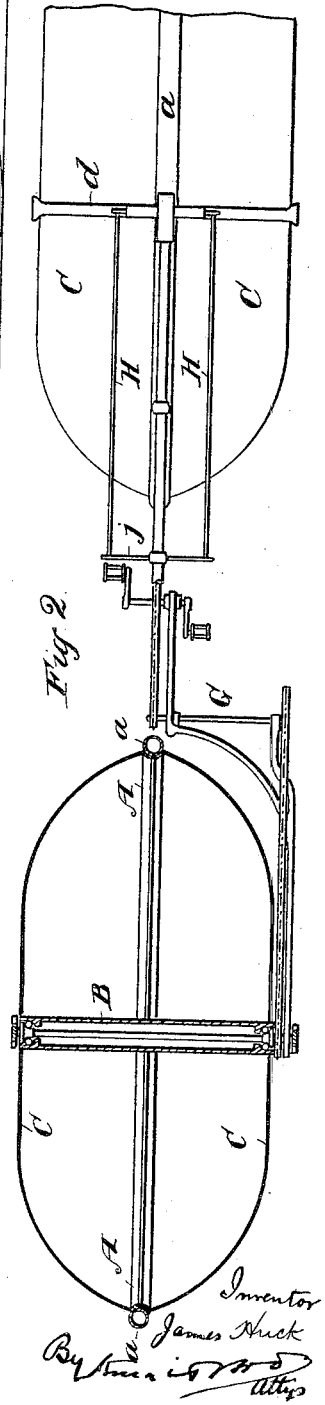

No. 622,477. Patented Apr. 4, 1899.
J. HUCK.
CYCLE OR OTHER WHEELED VEHICLE.
(Application filed Dec. 9, 1898.)
(No Model.) 2 Sheets—Sheet 2.
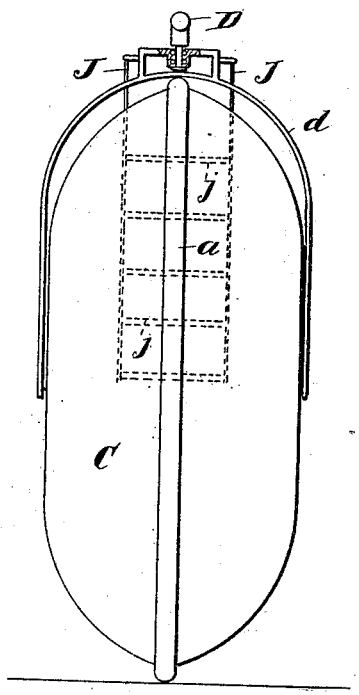

UNITED STATES PATENT OFFICE.

JAMES HUCK, OF GALASHIELS, SCOTLAND.

CYCLE OR OTHER WHEELED VEHICLE.

SPECIFICATION forming part of Letters Patent No. 622,477, dated April 4, 1899.

Application filed December 9, 1898. Serial No. 698,756. (No model.)

*To all whom it may concern:*

Be it known that I, JAMES HUCK, a subject of the Queen of Great Britain, residing at Galashiels, Scotland, have invented certain new and useful Improvements in Cycles or other Wheeled Vehicles, of which the following is a specification.

The object of my invention is to facilitate the propulsion of cycles and other wheeled vehicles by counteracting or reducing the weight of the vehicle by the application of receptacles of hydrogen or other gas which is lighter than the atmosphere.

To this end my invention consists, broadly, of a cycle or other wheeled vehicle having applied to any suitable part one or more receptacles containing hydrogen or other light gas. I prefer to apply the gas-containing receptacles to the wheels of the vehicle, and in this application of the invention a receptacle of some suitable light material capable of holding the gas is built up upon the wheel within the rim and around the axle.

In order that my invention may be fully understood, I will first describe the same with reference to the accompanying drawings, and afterward point out the novelty with more particularity in the annexed claims.

In said drawings, Figure 1 is a side elevation of a cycle of peculiar construction embodying my invention. Fig. 2 is a plan view of the same, having part of the frame broken away and the rear wheel shown in section. Fig. 3 is a front elevation of the same with part broken away.

The wheels of the vehicle are of any suitable construction, having the usual rim A, pneumatic tire $a$, a hollow extended axle B, and suitable spokes connecting the rim with the axle B have built upon them the gas-receptacles C, which may be formed of any light gas-tight material, such as silk. The material of which the gas-receptacle is formed is suitably secured to the rim A and to the ends of the hollow axle B.

The cycle or other vehicle frame may be of any suitable construction; but in the drawings I have shown a frame of peculiar construction, consisting of a horizontal main bar D, to the rear end of which is rigidly secured the rear fork $d$, and to the front end of which is journaled in any suitable manner the front fork $d'$. I prefer to have the wheels of very much larger diameter than in the ordinary construction of cycle in order to provide sufficient space between the wheels and main frame for the seat of the rider. The saddle E is suspended from the bar D between the wheels by means of chains, cords, or wires F, either one or both of which may be made adjustable to regulate the height of the saddle in the machine. Suspended from the rear support F is another cord, wire, or chain, which engages the frame of the driving-gear, which is journaled to the axle of the rear wheel and is adjustable upon its journal by means of the supporting connection with the support F. The driving-gear may be of any suitable construction, such as the chain-gear shown.

The front steering-fork $d'$, which is journaled to the main frame-bar D, is connected, through a pair of cords or rods H, with one of the horizontal rods $j$, supported by vertical cords J. The cords J support a series of horizontal rods $j$, and being flexible may be rolled up more or less to lengthen or shorten them at will.

The gas-receptacles applied to the wheels or any other part of the vehicle counteract the weight of the vehicle, and thereby facilitate the propulsion of the same.

Having thus described my invention, what I claim, and desire to secure by Letters Patent, is—

1. In combination with a cycle or other wheeled vehicle, the wheels upon which the vehicle is secured, and light gas-tight receptacles mounted upon the wheels, within the rims and around the hubs, substantially as and for the purpose set forth.

2. In combination with a cycle or other wheeled vehicle, the wheels consisting of the tired rims A, extended tubular hubs B to which the tires A are connected by suitable spokes, and the gas-receptacles formed by a suitable light material C attached to the rim A and ends of the hub B and inclosing the space between the rim and hub, substantially as and for the purpose set forth.

JAMES HUCK.

Witnesses:
JOHN MITCHELL,
PETER MACLACHLAN.